United States Patent [19]

Berlin et al.

[11] Patent Number: 5,658,622
[45] Date of Patent: Aug. 19, 1997

[54] PACKAGING LAMINATE AND A METHOD OF PRODUCING THE SAME

[75] Inventors: Mikael Berlin, Lund; Bó Lundgren, Kävlinge, both of Sweden

[73] Assignee: Tetra Laval Holdings & Finance S.A., Pully, Switzerland

[21] Appl. No.: 446,147

[22] Filed: May 22, 1995

Related U.S. Application Data

[63] Continuation of Ser. No. 234,108, Apr. 28, 1994, abandoned.

[30] Foreign Application Priority Data

Apr. 29, 1993 [SE] Sweden .................. 9301449

[51] Int. Cl.$^6$ .................. B32B 9/02; B32B 9/04; B32B 9/06; B32B 29/00
[52] U.S. Cl. .................. 428/34.2; 428/36.6; 428/219; 428/533; 428/537.5; 427/395; 156/299; 156/308.6; 536/20; 536/123.1
[58] Field of Search .................. 428/34.2, 36.6, 428/36.7, 532, 533, 537.5, 219; 536/18.7, 20, 3, 30, 45, 56, 102, 123, 123.1, 123.13; 427/333, 337, 338, 372.2, 391, 393.4, 395, 394, 396, 411; 156/305, 307.1, 307.3, 307.5, 307.7, 308.2, 308.6, 308.8, 297, 299

[56] References Cited

U.S. PATENT DOCUMENTS

| | | | |
|---|---|---|---|
| 4,195,175 | 3/1980 | Peniston et al. | 536/20 |
| 4,301,067 | 11/1981 | Koshugi | 260/112.5 R |
| 4,414,354 | 11/1983 | Slocombe | 524/460 |
| 4,675,245 | 6/1987 | Von Meer | 428/328 |
| 4,708,947 | 11/1987 | Maruyama et al. | 503/209 |
| 4,938,998 | 7/1990 | Stock | 427/223 |
| 5,015,293 | 5/1991 | Mayer et al. | 106/162 |
| 5,089,307 | 2/1992 | Ninomiya et al. | 428/35.2 |
| 5,219,749 | 6/1993 | Bouriotis et al. | 435/227 |
| 5,338,406 | 8/1994 | Smith | 162/168.2 |
| 5,462,866 | 10/1995 | Wang | 435/174 |

FOREIGN PATENT DOCUMENTS

| | | |
|---|---|---|
| 56-58869 | 5/1981 | Japan . |
| 4249151 | 9/1992 | Japan . |
| 4293460 | 10/1992 | Japan . |

*Primary Examiner*—Paul J. Thibodeau
*Assistant Examiner*—Vivian Chen
*Attorney, Agent, or Firm*—Burns, Doane, Swecker & Mathis, L.L.P.

[57] ABSTRACT

A packaging laminate comprising a rigid, but foldable paper or paperboard layer which has, at least on its one side, an outer film or coating of a water-insoluble polysaccharide compound which imparts to the packaging laminate tightness properties against liquid and water vapor and good sealing properties. Preferably, the other side of the core layer also has an outer film or coating of said polysaccharide compound. The polysaccharide compound in the two outer films or coatings contains a first water-soluble polysaccharide of polyanionic character and a second water-soluble polysaccharide of polycationic character, these being chemically or otherwise bonded to one another to form the water-insoluble polysaccharide compound. One preferred such polysaccharide compound may, for example, consist of a chemical compound or a chemical complex of chitosan and agar.

20 Claims, 1 Drawing Sheet

PACKAGING LAMINATE AND A METHOD OF PRODUCING THE SAME

This application is a continuation of application Ser. No. 08/234,108, filed Apr. 28, 1994 abandoned.

TECHNICAL FIELD

The present invention relates to a packaging laminate including a core layer, and a film or coating possessing good sealing properties and low water vapor permeability applied to one or both sides of the core layer. The present invention also relates to a method of producing the packaging laminate.

BACKGROUND ART

Nowadays, packaging containers of the single-use disposable type are often employed for packing and transporting foods of a liquid nature, such as milk. The material in these so-called single-use packages is normally composed of a plurality of mutually laminated layers of the same or different materials which, in cooperation with one another, impart the desired mechanical and chemical properties to the package.

A well-known packaging laminate which has long been employed in the art for this type of package consists, for example, of one or more inner layers of a fiber material, which gives the package the requisite mechanical strength and configurational stability, and outer layers of plastics which give the package its necessary tightness properties against liquids which could otherwise readily penetrate into the fiber layers of the packaging material and thereby weaken the mechanical strength and bond properties of the package. Preferably, the outer plastics layer of the packaging laminate consists of thermoplastic, ideally polyethylene, which is impermeable to liquid and moisture and which, moreover, makes the packaging laminate heat-sealable or fusible in such a manner that mutually facing plastics layers of the packaging laminate may readily be united to one another by surface fusion for the formation of mechanically strong, liquid-tight sealing joints or seams during the packaging production process.

Thus, from a web of the above-described prior art packaging laminate, there are produced configurationally stable, liquid-tight single use packages employing modern, rational packaging machines which reform the web into a tube, in that the two longitudinal edges of the web are brought to overlap one another and are fused to one another in a longitudinal lap joint or seam. The tube is filled with the desired contents and then divided into closed, cushion-shaped packages by repeated transverse sealings of the tube, transversely of the longitudinal axis of the tube, beneath the level of the contents in the tube. The packages are separated from one another by incisions in the transverse sealing zones and are given the desired geometric, normally parallelepipedic, final form by a subsequent forming and sealing operation.

Even if a packaging laminate of the above-outlined type with outer layers of thermoplastic functions satisfactorily in several respects, it nevertheless suffers from numerous serious drawbacks. Thermoplastics, for example polyethylene, are extracted from oil which is a non-renewable natural resource and consequently runs the long-term risk of becoming exhausted. At the same time, it is currently difficult (and in many cases impossible) to recover and recycle the thermoplastic in spent packaging laminates and used packages. Further, thermoplastics are plastics which are biologically difficult to degrade and, in order to counteract the growth of the much debated "refuse mountain", it is often necessary to incinerate the used packaging material, with other consequential environmental problems.

SUMMARY OF THE INVENTION

One object of the present invention is therefore to realize a packaging laminate of the type described by way of introduction without those problems and drawbacks from which the prior art technology suffers.

According to the present invention, it has surprisingly proved possible to produce and use for packaging purposes a film or a coating of a polysaccharide compound which, without being linked to any scientifically verified theory, is assumed to be a chemical product or chemical complex of a first water-soluble polysaccharide of cationic character and a second water-soluble polysaccharide of anionic character which, by chemical or other form of bonding, unite with one another for the formation of the water-insoluble polysaccharide compound. Likewise, it has surprisingly proved that such a film or coating possesses excellent tightness properties against liquid and moisture, in particular low water vapor permeability, at the same time as the film or coating, respectively, possesses superior heat sealing properties and is, therefore, easy to heat seal or fuse by conventional heat-sealing techniques.

What is particularly advantageous is that both the first and the second polysaccharides occur in nature and are easy to extract from biological raw materials sources which are renewable and, consequently, do not run the risk of becoming exhausted.

In one preferred embodiment of the present invention, the first, water-soluble polysaccharide consists of chitosan which occurs in abundance and is easy to extract from the shells of marine crustaceans such as crabs. In its natural environment, chitosan is electrically neutral but can, by known techniques (the deacetylation method) in an alkaline environment, be given the character of a polycation. This technique is based on the concept of replacing ring-bonded acetyl groups therefor.

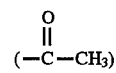

with ammonium groups (—NH$_3$+) which are assumed to be those active groups to which the second water-soluble polysaccharide bonds on production of the water-insoluble polysaccharide compound according to the invention. The degree of deacetylation, i.e. the proportion of replaced acetyl groups of the total number of acetyl groups of the thus activated chitosan polysaccharide can vary within broad limits, but should be in excess of 10% in order to give a sufficient number of active groups available for reaction with the second polysaccharide.

The second water-soluble polysaccharide is, according to the present invention, selected from the group essentially comprising agar, alginate, pectin, karrageenan, starch, modified starch, cellulose and derivative thereof. By preference, agar is selected.

A further object of the present invention is to realize a method of producing the packaging laminate according to the invention.

BRIEF DESCRIPTION OF THE DRAWINGS

The present invention will now be described and explained in greater detail hereinbelow, with particular reference to the accompanying Drawings. In the accompanying Drawings.

DETAILED DESCRIPTION OF THE INVENTION

Figure 1:
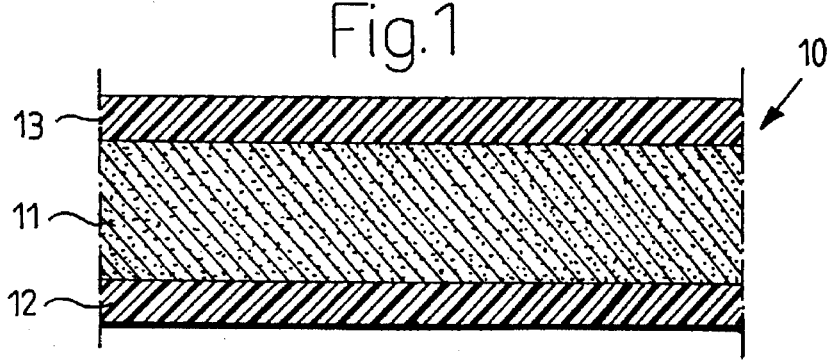
FIG. 1 schematically illustrates a cross section of a packaging laminate according to one preferred embodiment of the present invention.

The packaging laminate according to the invention illustrated in FIG. 1 has been given the generic reference numeral 10. The packaging laminate 10 includes a rigid, but foldable core layer 11 of paper or paperboard which, on its one side, has an outer film or coating 12 of a water-insoluble polysaccharide compound bonded to the core layer 11. In the illustrated embodiment, the outer polysaccharide film or coating 12 is disposed against that side of the core layer 11 which is intended to be turned to face inwardly in a packaging container produced from the packaging laminate 10, for direct contact with the contents of the packaging container. As illustrated in FIG. 1, the packaging laminate 10 preferably also has an outer film or coating 13 of a polysaccharide compound on the other side of the core layer 11 which, thus, is intended to form the outside of the packaging container. Since the films or coatings 12 and 13 both consist of a water-insoluble polysaccharide compound with superior tightness properties against both liquid and water vapor, the one outer film or coating 12 affords to the inner core layer 11 of the packaging laminate 10 good protection against the penetration of liquid and other moisture from the contents of the packaging container, at the same time as the second, outer film or coating 13 efficiently protects the core layer 11 against exterior moisture which may occur in the ambient surroundings of the container.

As has been mentioned previously, the polysaccharide compound in the outer films or coatings 12 and 13 consists, on the one hand, of a first water-soluble polysaccharide (A) and, on the other hand, a second water-soluble polysaccharide (B) which together, by chemical or other bonding between active cation groups in the first polysaccharide and active anion groups in the second polysaccharide, form the water-insoluble, liquid and water-vapor proof, heat-sealable polysaccharide compound.

The first water-soluble polysaccharide (A) preferably consists of chitosan which is a polysaccharide extracted from, for example, crabs and similar marine crustaceans, and which, by known deacetylation techniques, has been given the character of a polycation in that some or all of the ring-bonded acetyl groups in the chitosan polysaccharide have been replaced by ammonium groups. The degree of deacetylation of the chitosan polysaccharide may vary over a broad range, but should be in excess of 10% in order to give a sufficient number of active cation groups for reaction with correspondingly active anion groups in the second polysaccharide (B).

The second water-soluble polysaccharide (B) may be selected from among agar, alignate, pectin, karrageenan, starch, modified starch, cellulose and derivatives thereof, preferably agar. Agar (which can readily be extracted from, for instance, marine algae) is commercially available and displays anion groups available for bonding to the cation groups of the chitosan polysaccharide in the form of sulphon groups ($SO_3-$).

In the preferred embodiment of the present invention, the polysaccharide compound thus consists, in both of the outer films or coatings 12 and 13 of the packaging laminate, of a water-insoluble polysaccharide compound of chitosan and agar in which the above-mentioned cation groups in the chitosan polysaccharide are chemically or otherwise bonded to the above-mentioned anion groups in the agar polysaccharide.

The thickness of the outer polysaccharide films or coatings 12 and 13 of the packaging laminate 10 may vary, but is preferably of the order of magnitude of between 5 and 15 μm each, which gives to the packaging laminate 10 its requisite tightness properties and heat-sealable (fusible) properties. Thicknesses within the above range correspond to surface weights of between 5 and 15 $g/m^2$.

Figure 2:
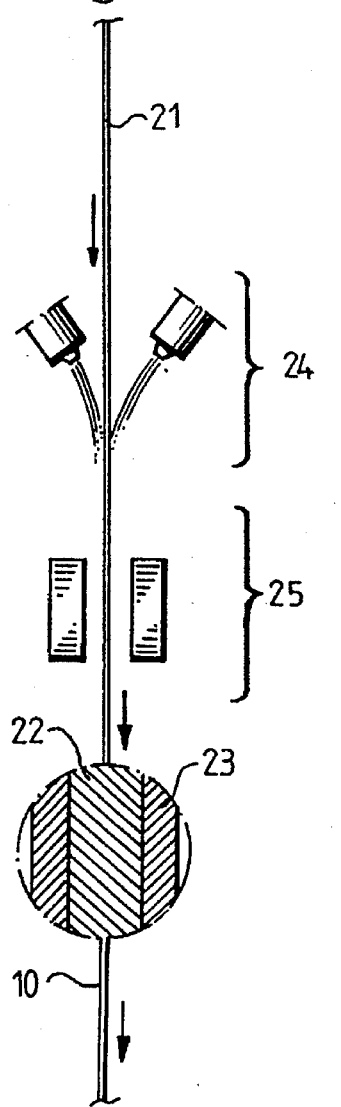
FIG. 2 schematically illuminates a method of producing a packaging laminate according to the present invention.
Figure 3:
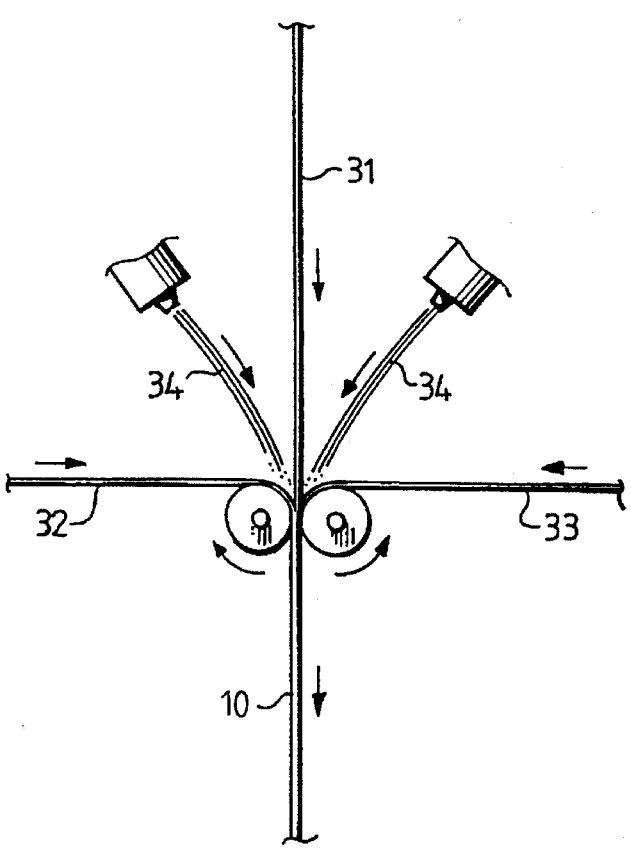
FIG. 3 schematically illuminates an alternative method of producing a packaging laminate according to the present invention.

According to the invention, the packaging laminate 10 in FIG. 1 can be produced either by a coating operation which is schematically illustrated in FIG. 2, or by a lamination operation which is schematically illustrated in FIG. 3.

According to FIG. 2, the packaging laminate is produced in that an aqueous solution of the first water-soluble polysaccharide (A) and the second water-soluble polysaccharide (B) are first prepared, and thereafter (at 24) the aqueous solution is applied to one or both sides of a web 21 of paper or board which finally (at 25) is dried for driving off water, for the formation of water-insoluble polysaccharide coatings 22 and 23, respectively.

In one embodiment employing chitosan as first polysaccharide (A) and agar as second polysaccharide (B), the procedure may be as follows: 4% by weight of chitosan is dissolved in cold, acidified (pH<6,5) water for forming a first aqueous solution, and 4% by weight of agar is dissolved or slurried in cold water and boiled for forming a second aqueous solution. The two aqueous solutions are mixed together in such a mixing ratio that the thus obtained aqueous solution contains between 1 and 80% by weight of chitosan, and the mixture is heated to 60°–70° C. The thus heated aqueous solution is applied in liquid form to one or both sides of the web in a continuous, blanketing layer in such a quantity that the applied layer, after driving off of water, has a thickness of between 5 and 15 μm (corresponding to a surface weight of between 5 and 15 $g/m^2$).

According to FIG. 3, the packaging laminate according to the invention is produced by lamination of a web 31 of paper or board with two prefabricated films (32 and 33) of the water-insoluble polysaccharide compound which preferably consists of a chemical compound or a chemical complex of chitosan and agar. The web 31 is brought together with the two prefabricated films, at the same time as hot water 34 or steam is fed in between the web and each respective film, whereby the polysaccharide film is activated and permanently bonded under pressure to the web. The prefabricated polysaccharide films have, in this example, a thickness of between 5 and 15 μm each (corresponding to a surface weight of between 5 and 15 $g/m^2$).

As is apparent from the foregoing description, there will be realized in a simple manner and by simple means, a packaging laminate of the type described by way of introduction which possesses excellent tightness and sealing properties, without consequential problems and drawbacks of the type from which the prior art technique suffers.

The packaging laminate according to the invention is an environmentally advantageous and valuable material, since it substantially consists only of naturally occurring materials and, thus, does not add environmentally foreign matter to nature.

Even though the present invention has been described and explained with particular reference to specific embodiments and selection of starting materials and dimensions, it will be obvious to a person skilled in the art that modifications are possible within the scope of the inventive concept. Such modifications thus lie within the spirit and scope of the present invention as defined in the appended Claims. For example, it is possible without departing from the spirit and scope of the present invention, to supplement the described packaging laminate with one or more additional layers of material of the same or other type than those mentioned and described herein.

What is claimed is:

1. A packaging laminate comprising a core layer of fiber material having opposite surfaces, and a polysaccharide barrier layer applied to at least one of the surfaces of the core layer, wherein the polysaccharide barrier layer consists essentially of a cationic water-soluble polysaccharide and an anionic water-soluble polysaccharide which unite with one another to form a water-insoluble polysaccharide barrier layer which protects against penetration of the packaging laminate by water vapor or liquid.

2. The packaging laminate as claimed in claim 1, wherein the cationic water-soluble polysaccharide consists of chitosan which is at least partly deacetylated.

3. The packaging laminate as claimed in claim 2, wherein said chitosan has a degree of deacetylation of at least 10%.

4. The packaging laminate as claimed in claim 2, wherein the anionic water-soluble polysaccharide is selected from the group consisting of agar, alginate, pectin, karrageenan, starch, cellulose and derivatives thereof.

5. The packaging laminate as claimed in claim 1, wherein the polysaccharide barrier layer has a thickness of between 5 and 15 μm, corresponding to a surface weight of between 5 and 15 g/m$^2$.

6. The packaging laminate as claimed in claim 1, wherein the core layer consists of paper or paperboard.

7. The laminate as claimed in claim 1, wherein the cationic water-soluble polysaccharide consists of chitosan which is at least partly deacetylated and the anionic water-soluble polysaccharide consists of agar.

8. A method of producing a packaging laminate, comprising: applying a mixture consisting essentially of a cationic water-soluble polysaccharide and an anionic water-soluble polysaccharide to at least one side of a continuous web of fiber material; and thereafter drying the web to form a packaging laminate wherein the cationic and anionic water-soluble polysaccharides unite with one another to form at least one water-insoluble polysaccharide coating which protects against penetration of the packaging laminate by water vapor or liquid.

9. The method as claimed in claim 8, wherein the cationic water-soluble polysaccharide consists of chitosan which is at least partly deacetylated.

10. The method as claimed in claim 9, wherein the anionic water-soluble polysaccharide is selected from the group consisting of agar, alginate, pectin, karrageenan, starch, cellulose and derivatives thereof.

11. The method as claimed in claim 8, wherein the cationic water-soluble polysaccharide consists of chitosan which is at least partly deacetylated and the anionic water-soluble polysaccharide consists of agar.

12. The method as claimed in claim 8, wherein the cationic water-soluble polysaccharide consists of chitosan that is at least 10% deacetylated, and the anionic water-soluble polysaccharide is selected from the group consisting of agar, alginate, pectin, karrageenan, starch, cellulose and derivatives thereof.

13. A method of producing a packaging laminate, comprising: laminating a prefabricated polysaccharide film to at least one side of a continuous web of fiber material, wherein the prefabricated polysaccharide film consists essentially of a cationic water-soluble polysaccharide and an anionic water-soluble polysaccharide which unite with one another to form a water-insoluble prefabricated polysaccharide film which protects against penetration of the packaging laminate by water vapor or liquid.

14. The method as claimed in claim 13, wherein the cationic water-soluble polysaccharide consists of chitosan which is at least partly deacetylated.

15. The method as claimed in claim 14, wherein the anionic water-soluble polysaccharide is selected from the group consisting of agar, alignate, pectin, karrageenan, starch, cellulose and derivatives thereof.

16. The method as claimed in claim 13, wherein the web and prefabricated film are laminate to one another under pressure by means of hot water or steam which is fed between the web and the prefabricated film.

17. The method as claimed in claim 13, wherein the cationic water-soluble polysaccharide consists of chitosan which is at least partly deacetylated and the anionic water-soluble polysaccharide consists of agar.

18. The method as claimed in claim 13, wherein the cationic water-soluble polysaccharide consists of chitosan that is at least 10% deacetylated, and the anionic water-soluble polysaccharide is selected from the group consisting of agar, alginate, pectin, karrageenan, starch, cellulose and derivatives thereof.

19. A packaging laminate comprising a core layer of fiber material having opposite surfaces, and a polysaccharide barrier layer applied to at least one of the surfaces of the core layer, wherein the polysaccharide barrier layer consists of a cationic water-soluble polysaccharide and an anionic water-soluble polysaccharide which unite with one another to form a water-insoluble polysaccharide barrier layer which protects against penetration of the packaging laminate by water vapor or liquid, wherein said cationic polysaccharide is chitosan that is at least 10% deacetylated and said anionic polysaccharide is selected from the group consisting of agar, alginate, pectin, karrageenan, starch, cellulose and derivatives thereof.

20. The packaging laminate as claimed in claim 19, wherein the anionic water-soluble polysaccharide consists of agar.

* * * * *